2,556,829

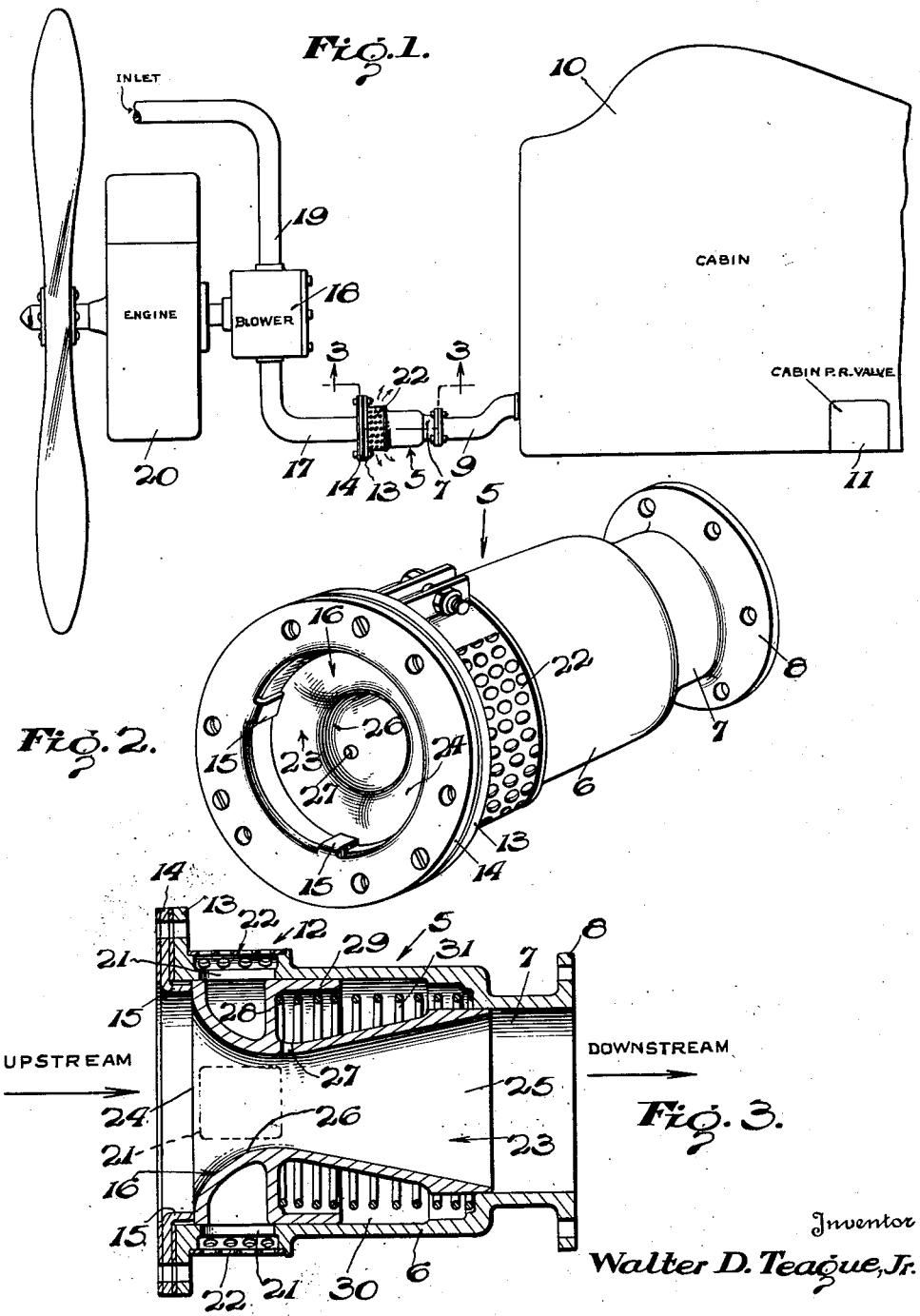
June 12, 1951     W. D. TEAGUE, JR     2,556,829
FLUID REGULATOR
Filed March 20, 1945
Inventor
Walter D. Teague, Jr.
By Robert F. Beck,
Attorney Patented June 12, 1951

UNITED STATES PATENT OFFICE 2,556,829

FLUID REGULATOR

Walter D. Teague, Jr., Alpine, N. J., assignor to Bendix Aviation Corporation, Teterboro, N. J., a corporation of Delaware Application March 20, 1945, Serial No. 583,722

8 Claims. (Cl. 137—152.5)

My invention relates to flow regulators and has, as one of the objects thereof, the provision of a device which is so constructed and arranged as to automatically limit to a predetermined value the amount of air delivered by the device to an enclosure, for instance, an aircraft cabin or the like.

Another object of my invention is to provide a device of the foregoing described character which is equipped with flow responsive means of a relatively high sensitivity for controlling the air delivered through the device.

A further object of my invention is to provide a device of the foregoing described character which is equipped with means for controlling the rate of flow of the air delivered within a predetermined range and which may be readily replaced to modify or change the range.

An important object of my invention is to provide a device of the foregoing described character which is simple in construction, durable in use, efficient in operation, economical in manufacture, easy of installation and which lends itself to mass production.

Another object of my invention is to provide a device of the foregoing described character which is so constructed and arranged as to be completely automatic in its operation and which requires no adjustment after initial installation.

A special object of my invention is to provide a device of the foregoing described character which is of the so called "dry" operating type to eliminate sticking on cold starts.

With the above and other objects in view, as will hereinafter appear, the invention consists in the combination, and arrangement of parts hereinafter set forth and illustrated in the accompanying drawings, from which the several features of the invention and the advantages attained thereby will be readily understood by those skilled in the art.

Referring to the drawings wherein like reference characters designate like parts throughout the several views.

Figure 1 is of a side elevation of my invention illustrated in conjunction with the air supply line leading from the blower to the cabin of an aircraft.

Figure 2 is a perspective view of the device.

Figure 3 is a sectional view, on an enlarged scale, taken on the line 3—3 of Figure 1.

As illustrated in the drawing, the flow regulating device 5 comprises a cylindrical housing 6 formed at one end with a diametrically reduced end section 7 constituting the discharge, outlet or delivering end or passage of the valve and which end section is provided with a flange 8 secured to a similar flange carried by an air delivery conduit 9 leading to and discharging into an aircraft cabin 10, the latter being provided with a cabin pressure regulating valve 11 of ordinary construction. The opposite end section 12 of the housing constitutes the intake or feed end or passage of the valve and is provided with a flange 13 having secured thereto a gasketed ring 14 provided on its inner peripheral face with a plurality of spaced fingers 15 extending within the housing 6 and serving as abutments for engaging and limiting the movement of a venturi-nozzle shaped valve member 16 disposed within the housing and hereinafter more fully described. The flange 13 and ring 14 are secured together in sealed relation and to a flange carried by an air feed conduit 17 leading from the output of a blower or supercharger 18, the latter having an air inlet 19 and being driven by the aircraft engine 20. Adjacent the flange 13, the housing is formed with a plurality of air waste ports 21 covered by a perforated band or screen 22 clamped about the housing as clearly illustrated in Figure 2 of the drawing.

The valve member 16 is formed with a venturi passage 23 having inlet and outlet portions 24 and 25 respectively defining therebetween a throat 26 having its wall provided with an orifice or pressure top 27. The margin of the radial face of the inlet portion 24 of the valve member is adapted to be disposed in abutting relation with the fingers to preclude discharge of air from the conduit 17 to the atmosphere through the ports 21 and to permit such discharge when the valve member is moved away from fingers 15 within the housing as hereinafter made apparent. The outer peripheral face of the outlet portion 25 of the valve member is disposed in sliding and sealing engagement with the inner peripheral face of the section 7, while the valve member, on its outer circumferential face adjacent the throat, is provided with a rib 28 formed with a marginal flange 29 having sliding and sealing engagement with the housing between the ports 21 and the chamber 30 as clearly illustrated in Figure 3 of the drawing. The rib 28 coacts with the housing to define a suction, expansible air chamber 30 about the valve member between the rib and the section 7 and from which air is evacuated through the orifice 27 to keep the pressure in chamber 30 substantially the same as that in the throat 26. Sleeved about the valve member, between the rib and section 7, is a spring 31 urging the valve member towards the fingers 15 to tend to close the intake or feed end of the housing with respect to the waste ports 21 as heretofore described.

Inasmuch as the inlet portion of the venturi passage is of a greater diameter than the throat portion, lowering of pressure in the chamber 30 with respect to the pressure in the intake section of the housing, by evacuating the air through the orifice 27, effects movement of the valve member away from fingers 15 since the difference between the throat pressure in the venturi passage and the inlet pressure has a definite relation to the air flow, thus, when the flow through the venturi passage has risen to a predetermined value, the lowered pressure in the chamber 30 will move the valve member against the tension of the spring. When the valve member is thus moved, the waste ports 21 serve to effect communication between the atmosphere and the intake passage of the housing to preclude further increase of air flow through the venturi passage. Obviously, by utilizing a spring with a desired free length and rate, the amount of air delivered to the cabin can be regulated within a predetermined range dependent upon the spring force in the valve's working range since throttling of the flow of air wasted by the valve by restricting or closing the ports 21 will control and regulate the flow of air to the cabin. By utilizing a spring of a different free length and rate, the range may be modified to meet desired requirements.

Although only one embodiment of the invention has been illustrated and described, various changes in the form and relative arrangements of the parts may be made to suit requirements.

What I claim is:

1. In a fluid regulator, the combination of a housing having inlet and outlet passages of different cross-sectional areas in communication with each other, and a waste port in communication with one of said passages; a hollow through-flow member slidably mounted within said housing and having a valve portion for varying the opening of the waste port upon the sliding of the member, a sleeve portion effecting communication between the inlet and outlet passages and sealingly fitting within the smaller passage, and a piston portion outside of the sleeve portion and sealingly fitting within the larger passage, said piston, sleeve, and housing being constructed to define a pressure chamber therebetween; means for setting up a pressure differential between the pressure chamber and a point in the through-flow member at which the pressure is affected by the waste port opening; the arrangement being such that, upon an increase in the differential pressure between the chamber and said point, the valve tends to change the waste port opening in the direction to tend to reduce the differential pressure; and means operatively connecting the housing with the member to continuously bias the member in the opposite direction, whereby the regulator tends to maintain the differential pressure constant.

2. In a fluid regulator, the combination of a housing having cylindrical inlet and outlet passages of different diameters in communication with each other, and a waste port in communication with one of said passages; a generally tubular through-flow member slidably mounted within said housing and having a valve portion for varying the opening of the waste port upon the sliding of the member, a sleeve portion effecting communication between the inlet and outlet passages and sealingly fitting within the smaller passage, and an annular piston portion outside of the sleeve portion and sealingly fitting within the larger passage, said piston, sleeve, and housing being constructed to define a pressure chamber therebetween; means for setting up a pressure differential between the pressure chamber and a point in the interior of the sleeve; the arrangement being such that, upon an increase in the differential pressure between the chamber and said point, the valve tends to change the waste port opening in the direction to tend to reduce the differential pressure; and means operatively connecting the housing with the member to continuously bias the member in the opposite direction, whereby the regulator tends to maintain the differential pressure constant.

3. In a fluid regulator, the combination of a housing having cylindrical inlet and outlet passages of different diameters in communication with each other, and a waste port in communication with one of said passages; a generally tubular through-flow member slidably mounted within said housing and having a valve portion for varying the opening of the waste port upon the sliding of the member, a venturi-shaped sleeve portion effecting communication between the inlet and outlet passages and with the downstream end sealingly fitting within the smaller passage, and an annular piston portion outside of the sleeve portion and sealingly fitting within the larger passage, said piston, sleeve, and housing being constructed to define a pressure chamber therebetween; a pressure connection between the pressure chamber and the interior of the sleeve at the venturi throat; the arrangement being such that, upon an increase in the flow and hence of the differential pressure between the chamber and the larger passage, the valve tends to change the waste port opening in the direction to tend to reduce the differential pressure; and resilient means operatively connecting the housing with the member to continuously bias the member in the opposite direction, whereby the regulator tends to maintain the differential pressure, and hence the flow, constant.

4. The combination set forth in claim 3 in which the member is constructed to have its piston portion act also as its valve portion.

5. In a flow delivery control means, the combination of a housing means having an inlet, an outlet and a waste port, a passageway means including a venturi tube-like valve member slidably mounted in said housing and having an inlet and an outlet establishing communication between the inlet and outlet of the housing, a fluid pressure chamber, said valve member including a piston portion slidably mounted in said chamber, means providing fluid communication between the chamber and venturi throat, said slidable valve member arranged in controlling relation to said waste port, spring means biasing said valve member in a direction to close said waste port, and said valve member operable by the difference between the fluid pressures at the venturi inlet and in the chamber to move said valve in a direction to open the waste port so as to maintain the outlet flow substantially constant.

6. In a fluid flow delivery control means, the combination of a housing having an inlet, an outlet and an escape port, a floating valve member including a passage extending through said housing and establishing communication between said inlet and outlet, said member being slidably mounted in said housing and constructed and arranged to regulate the opening of said escape port, said member having a constriction in said through passage providing a surface on said member subject to inlet pressure and effecting differential pressure between the ends of said passage, a spring biasing said member in a direction opposing the force of the inlet fluid acting on said surface, a chamber, said valve member including a piston portion slidably mounted in said chamber, means providing fluid communication between the chamber and a low pressure point of said passage, the pressure acting on said piston in a direction opposing the force on said surface subject to inlet pressure, whereby said valve member is slidably positioned in response to differential pressure produced by variations in fluid flow through the passage so as to cause said floating member to govern said escape port in a sense such as to maintain the rate of flow of fluid through said member substantially constant.

7. In a fluid flow regulator, the combination of a housing having an aligned fluid inlet and outlet and a control port in communication with said inlet, a valve member slidably mounted in said housing constructed and arranged to regulate said control port and including a passage in alignment with said inlet and outlet and establishing communication between said inlet and outlet, said valve member having a constriction formed in said passage providing a surface on said valve member subject to inlet pressure and effecting differential pressure between the ends of said passage, a spring biasing said member in a direction opposing the force of the inlet fluid acting on said surface, said valve member including a chamber having a piston therein so constructed and arranged as to be subjected to the pressure at a low point in said passage whereby said differential pressure and spring coact to thereby regulate said control port in a manner to maintain outlet flow substantially constant.

8. In a fluid flow control means, the combination of housing having an aligned fluid inlet and outlet and a control port adjacent to and in communication with said inlet, a floating valve member including a passage therethrough in alignment with said inlet and outlet for establishing communication between said inlet and outlet, said valve member being slidably mounted in said housing and constructed and arranged to regulate said control port, said valve member having a constriction formed in the passage thereof providing a surface subject to said inlet pressure and effecting differential pressure between the ends of the passage, a spring biasing said valve member in a direction opposing the force of the inlet fluid acting on said surface, said valve member including piston means slidably mounted in said housing and subjected to the pressure at a low pressure point in said passage whereby said valve member is slidably positioned in response to said differential pressure and spring bias so as to regulate said control port in a sense such as to maintain the rate of fluid flow through said valve member substantially constant.

WALTER D. TEAGUE, Jr.

REFERENCES CITED

The following references are of record in the file of this patent:

UNITED STATES PATENTS

| Number | Name | Date |
| --- | --- | --- |
| 1,052,172 | Rateau | Feb. 4, 1913 |
| 1,923,595 | Temple | Aug. 22, 1933 |
| 2,102,865 | Vickers | Dec. 21, 1937 |